United States Patent [19]

Baba

[11] Patent Number: 4,794,932

[45] Date of Patent: Jan. 3, 1989

[54] CONVERSION CONTROL CIRCUIT FOR IMAGE DISPLAY APPARATUS

[75] Inventor: Tatsuro Baba, Ootawara, Japan

[73] Assignee: Kabushiki Kaisha Toshiba, Kawasaki, Japan

[21] Appl. No.: 30,688

[22] Filed: Mar. 26, 1987

[30] Foreign Application Priority Data

Mar. 31, 1986 [JP] Japan .................................. 61-70790
Mar. 31, 1986 [JP] Japan .................................. 61-70791

[51] Int. Cl.$^4$ .............................................. A61B 10/00
[52] U.S. Cl. .................................. 128/661.09; 358/82; 364/521
[58] Field of Search .................. 358/10, 15, 27, 29–30, 358/74, 80–82, 105, 112; 128/660, 663

[56] References Cited

U.S. PATENT DOCUMENTS

| | | | |
|---|---|---|---|
| 4,149,184 | 4/1979 | Giddings et al. | 358/81 |
| 4,477,831 | 10/1984 | Hosoya | 358/27 |
| 4,510,521 | 4/1985 | Ruprecht et al. | 358/27 |
| 4,602,277 | 7/1986 | Guichard | 358/27 X |
| 4,641,668 | 2/1987 | Namekawa | 128/663 |
| 4,694,330 | 9/1987 | Tanaka et al. | 358/80 X |
| 4,712,132 | 12/1987 | Soca | 358/27 X |

FOREIGN PATENT DOCUMENTS

0100094 2/1984 European Pat. Off. ............ 128/663

Primary Examiner—Francis J. Jaworski
Attorney, Agent, or Firm—Cushman, Darby & Cushman

[57] ABSTRACT

In an image display apparatus wherein color and black/white display data of an object under examination are utilized to display the object with color and black/white information on a single monitor screen, a gradation converting control circuit is employed to control both the brightness of the color display data and the brightness of the black/white display data to be at a substantially equal level with each other.

10 Claims, 8 Drawing Sheets

CONVERSION CONTROL CIRCUIT FOR IMAGE DISPLAY APPARATUS

BACKGROUND OF THE INVENTION

1. Field of the Invention

The present invention generally relates to a conversion control circuit for an image display apparatus, and more particularly to a conversion control circuit for controlling a ratio of brightness of an ultrasonic image of a human body to that of a color image such as blood-flow patterns. These colored patterns are superimposed with the ultrasonic image (black-and-white image) on the same monitor screen.

2. Description of Related Art

An ultrasonic blood-flow imaging apparatus is available as an apparatus for visualizing blood-flow information of a body under examination for diagnosis based on reflected echoes of ultrasonic waves transmitted toward and reflected from the interior of a body under examination.

In this imaging apparatus, the blood-flow information of the body is obtained by utilizing the frequency shift, i.e., Doppler shift, of the ultrasonic waves reflected from the blood flow. The blood-flow information is converted into predetermined colors corresponding to changes in direction and the average velocity of the blood flow and is superimposed on an ultrasonic B or M mode image (black-and-white image) of the body. For example, a blood flow flowing toward an ultrasonic probe is displayed in red, and blood flowing in a direction away from the ultrasonic probe is displayed in blue.

Such an imaging apparatus uses a color display cathode ray tube (CRT) as a monitor and employs the RGB drive method. According to the RGB drive method, in a dynamic range allowing a good white balance of the monitor, brightness Y is represented as:

$$Y \approx 0.3\ VR + 0.6\ VG + 0.1\ VB$$

where VR, VG, and VB are input voltages to the RGB color monitor. A white color is obtained when $VR = VG = VB$.

In the conventional blood-flow information display apparatus, blood-flow information (color image) superimposed on an ultrasonic image (black-and-white image) of a body under examination cannot be visually distinguished from the black-and-white image. This is probably caused by the following reasons.

Figure 1:
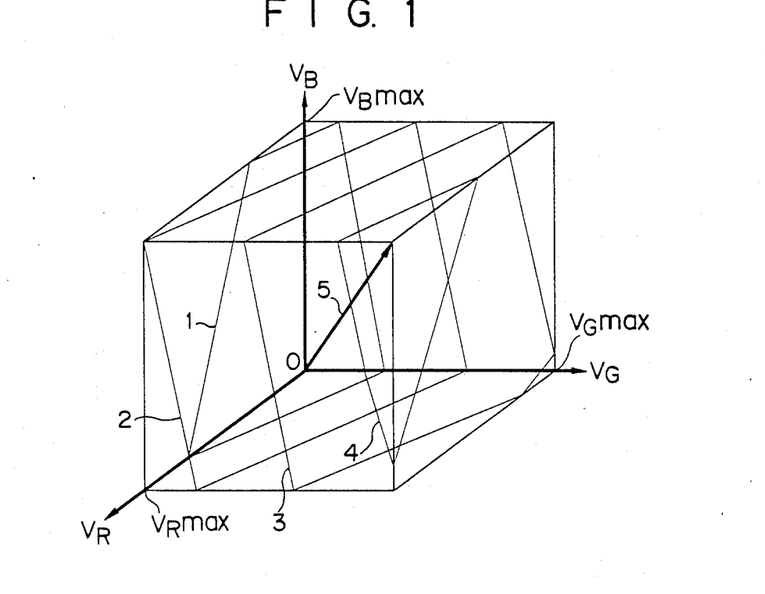
FIG. 1 is an illustration of a VR-VG-VB coordinate system for explaining a technical idea of the invention.
Figure 2:
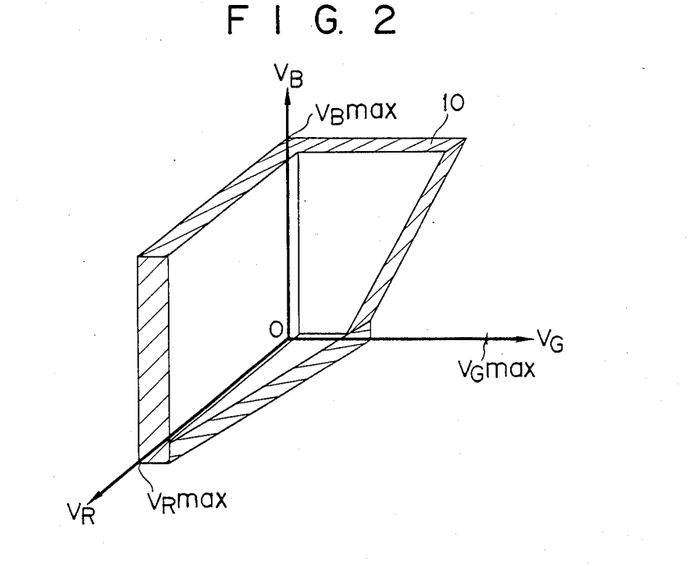
FIG. 2 is an illustration of a displayed color in relation to the coordinate system shown in FIG. 1.

FIG. 1 is an illustration of a VR-VG-VB orthogonal coordinate system, and FIG. 2 is an illustration of a displayed color.

Referring to FIG. 1, assuming that the respective maximum input voltages of an RGB color monitor are VRmax, VGmax, and VBmax, points having chromaticity brightnesses displayable on the RGB color monitor exist on and inside a cube having sides Vmax. Planes 1, 2, 3, and 4 are equi-bright planes of every 0.2 steps when the white brightness of a point (VRmax, VGmax, VBmax) is 1, and origin 0 (0, 0, 0) is 0. The gradation of a black-and-white image (ultrasonic B or M mode image) moves on diagonal line 5 connecting origin 0 and a maximum brightness point.

Referring to FIG. 2, the maximum brightness of a point in a region (blue or red region) indicated by hatched lines 10 and having a high saturation is lower than that of white color. Therefore, when a color belonging to this region is used for a gradation of a color image (blood-flow image), the color image cannot be clearly discriminated from the black-and-white image, because of a brightness imbalance between the black-and-white image and the color image.

A problem in blood-flow image display by the conventional ultrasonic blood-flow imaging apparatus has been described. Such a problem appears in other image display systems of various types for superimposing a color image on a black-and-white image.

As described above, in the conventional display system, when a color image is superimposed on a black-and-white image, the color image cannot be seen as clearly as can black-and-white image. An example of the conventional ultrasonic imaging apparatus of this type is disclosed in, e.g., European patent application No. 0100094.

It is an object of the present invention to provide a conversion control circuit for an image display apparatus which can distinctly display a color image distinguishably with respect to a black-and-white image when the color and black-and-white images are simultaneously displayed on the same monitor screen.

SUMMARY OF THE INVENTION

The object and features of the invention are accomplished by providing a gradation converting control circuit for an image display apparatus wherein color and black/white display data of an object under examination are utilized to display the object with color and black/white information on a single monitor screen, comprising a gradation converting control for controlling both the brightness of said color display data and the brightness of said black/white display data so as to be at a substantially equal level.

BRIEF DESCRIPTION OF THE DRAWINGS

The above purpose and other useful and novel features of the present invention will become more readily apparent in the following description in conjunction with the accompanying drawings, in which.

DETAILED DESCRIPTION OF PREFERRED EMBODIMENTS

Basic Idea of the Invention

Before describing in detail various types of the conversion control circuit according to the invention, a basic idea thereof will now be summarized.

First, assume that the maximum brightness of a displayed color $\vec{C}$ is (vector) and that of a black-and-white image is $\vec{W}$ (vector). The conversion control circuit is operated such that the brightness of the black-and-white image is substantially coincident with that of color images superimposed on the black-and-white image displayed on a monitor screen. This is the basic idea of the invention.

The following three methods are available as methods for practicing the basic idea of the invention.

FIRST MODE

Figure 3:
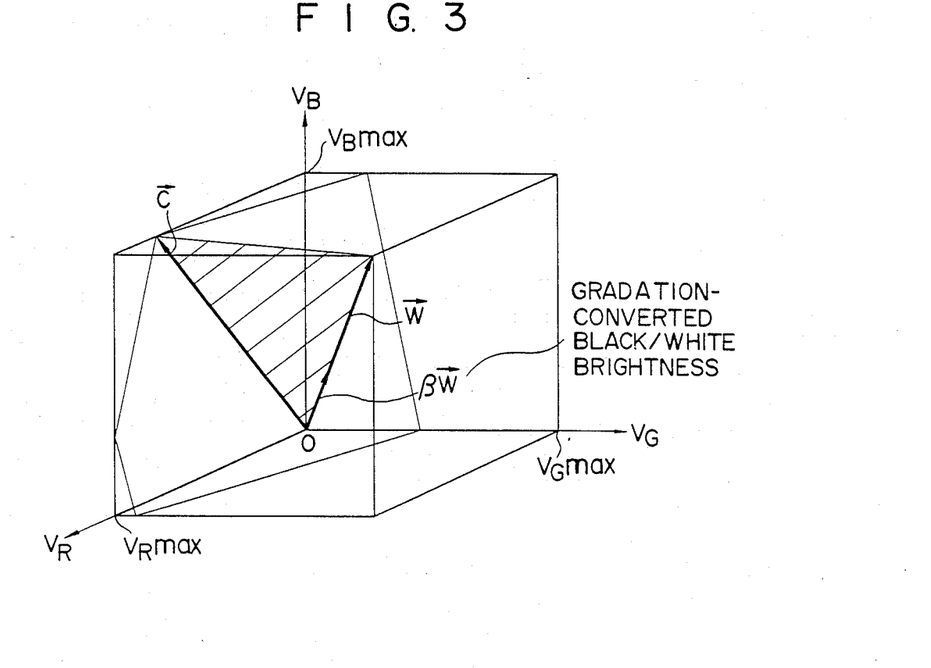
FIG. 3 is an illustration of a VR-VG-VB coordinate system for explaining a first mode idea of the invention.

As shown in FIG. 3, assume that the maximum brightness of a displayed color is $\vec{C}$, that of a black-and-white image is $\vec{W}$, and a coefficient "$\beta$" satisfies $0 < \beta < 1$. Gradation conversion of black-and-white display data is performed so that the maximum gradation of a black-and-white image is $\beta\vec{W}$.

Figure 4:
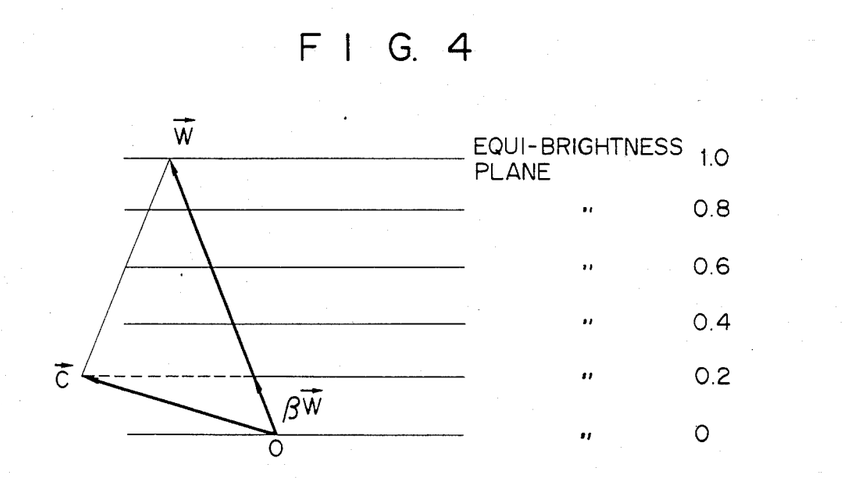
FIG. 4 shows an equi-brightness plane of the system shown in FIG. 3.

FIG. 4 is for explaining a relationship between an equi-brightness plane and $\vec{W}$, $\vec{C}$, and $\beta\vec{W}$ of the plane indicated by hatched line in FIG. 3. When gradation control of black-and-white display data is performed such that the maximum gradation of a black-and-white image is the dynamic ranges of $\vec{C}$ and $\beta\vec{W}$ substantially coincide, and brightness balance is accomplished between color and black-and-white images. The color image can thus be observed clearly. In other words, the displayed color image becomes distinguisable from the black-and-white image displayed on the monitor screen, the color image being superimposed on the black-and-white image. This is the characteristic feature of the first mode.

SECOND MODE

Figure 5:
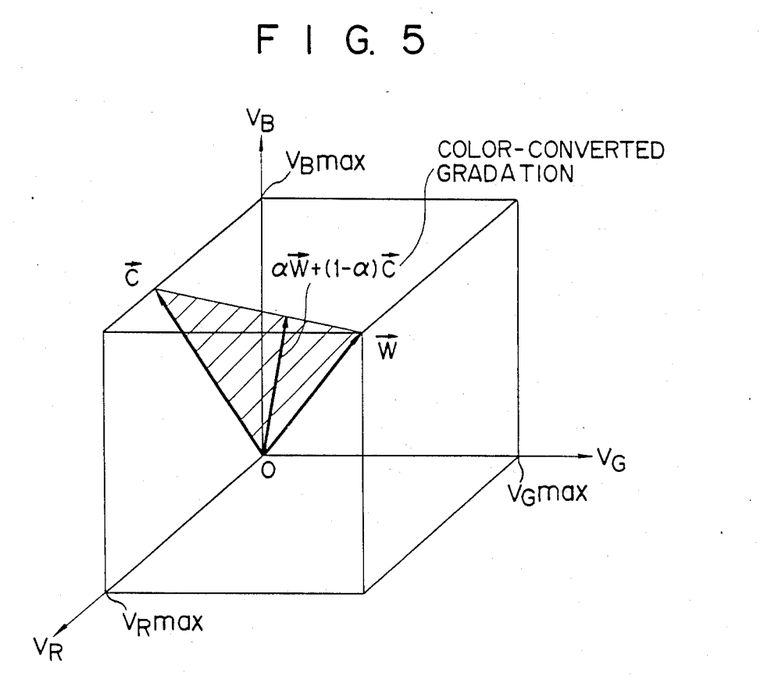
FIG. 5 is another illustration of a VR-VG-VB coordinate system for explaining a second mode idea of the invention.

Referring to FIG. 5, assume that the maximum brightness of a displayed color is $\vec{C}$, that of a black-and-white image is $\vec{W}$, and coefficient "$\alpha$" satisfies $0 < \alpha < 1$. Color conversion is performed such that the maximum gradation of color display is $\alpha\vec{W} + (1-\alpha)\vec{C}$.

Figure 6:
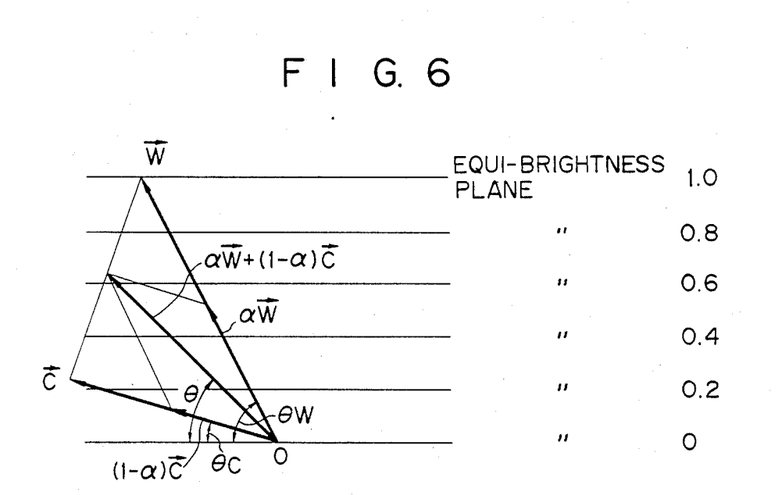
FIG. 6 shows an equi-brightness plane of the system shown in FIG. 5.

FIG. 6 is for explaining a relationship between the plane indicated by the hatched lines in FIG. 5. Referring to FIG. 6, assuming that the angles defined by equi-brightness plane O and $\vec{C}$, $\vec{W}$, and $\alpha\vec{W} + (1+\alpha)\vec{C}$ are $\theta C$, $\theta W$, and $\theta$, respectively, a relationship $\theta C < \theta < \theta W < 90°$ is established among these angles.

The brightness dynamic range of a black-and-white image is $|\vec{W}| \sin \theta W$, and that of a displayed color having a high saturation and a low brightness is $|\vec{C}| \sin \theta C$. The brightness dynamic range of a displayed color having a low saturation and a high brightness is $\alpha \cdot |\vec{W}| \sin \theta W + (1-\alpha) \cdot |\vec{C}| \sin \theta C$.

The relationship among these dynamic ranges satisfies $|\vec{C}| \sin \theta C < \alpha \cdot |\vec{W}| \cdot \sin \theta W + (1-\alpha) \cdot |\vec{C}| \sin \theta C < |\vec{W}| \sin \theta W$. When coefficient "$\alpha$" satisfies $0 < \alpha < 1$, the dynamic range of the displayed color is increased. Therefore, when color conversion is performed using $\alpha\vec{W} + (1-\alpha)\vec{C}$ as the maximum gradation of color display, a color image can be similarly displayed clearly.

The second mode will be summarized as follows.

In the first mode, the brightness of only W is decreased. In contrast to this, in the second mode, the brightness of only $\vec{C}$ is increased by rearranging $[(1-\alpha)\vec{C} + \alpha\vec{W}]$. As a result, the color changes, e.g., from red to pink.

THIRD MODE

The third mode has both characteristic features of the above first and second modes.

More specifically, the conversion control circuit is operated such that the maximum gradation of maximum brightness $\vec{W}$ of a black-and-white image is decreased ($\beta\vec{W}$) and simultaneously, the maximum gradation of color display is increased. This is the characteristic feature of the third mode.

GRADATION CONVERTING CONTROL CIRCUIT OPERATED IN FIRST MODE

Figure 7:
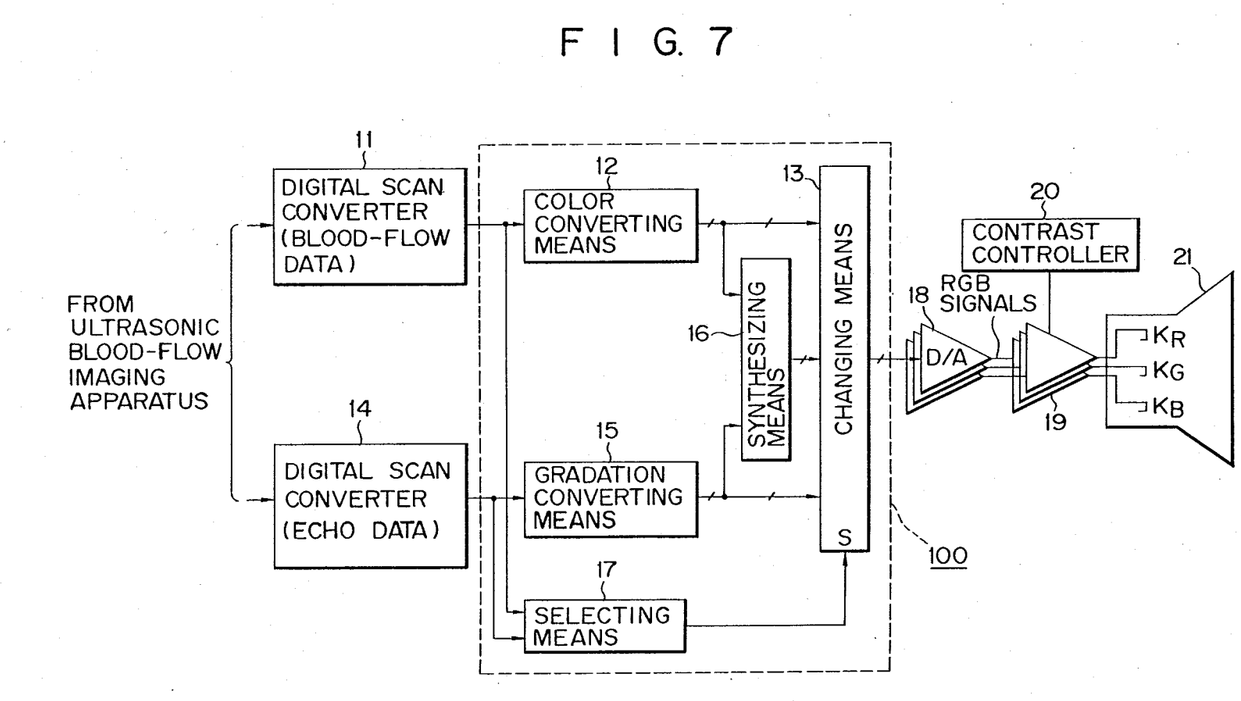
FIG. 7 is a schematic block diagram of a gradation converting control circuit 100 according to a first preferred embodiment.

Gradation converting control circuit 100 operable in the first mode described above, according to a first preferred embodiment, will be now described with reference to FIG. 7. In FIG. 7, shows present invention being applied to an ultrasonic blood-flow imaging apparatus. Control circuit 100 has color converting means 12, changing means 13, gradation converting means 15, synthesizing means 16, and selecting means 17. Color converting means 12 fetches blood-flow data (first data for color display) output from digital scan converter 11 and RBG-converts and outputs it. Color converting means 12 comprises, e.g., a ROM (read-only memory) for storing color conversion data (RGB). The conversion result is output to changing means 13 and to synthesizing means 16.

Gradation converting means 15 fetches echo data (second data for black-and-white display) output from digital scan converter 14, RGB-converts the data at the same weighting ratio for R, G, and B, and performs gradation conversion. By gradation conversion, the entire gradation of black-and-white display data is decreased so that the maximum gradation of a black-and-white image is $\beta\vec{W}$, assuming that the maximum brightnesses of a displayed color and a black-and-white image are $\vec{C}$ and $\vec{W}$, respectively, and that coefficient "$\beta$" satisfies $0 < \beta < 1$. In this sense, gradation converting means 15 is sometimes called a B/W-gain attenuator. An output from converting means 15 is fetched by changing and synthesizing means 13 and 16.

Synthesizing means 16 synthesizes outputs from converting means 12 and 15. Selecting means 17 compares the output states of converters 11 and 14. Changing means 13 operates in accordance with the comparison result, selects either outputs from converting means 12 and 15 or an output from synthesizing means 16, and supplies the selected output to digital/analog (D/A) converters 18 connected to its output stage. Outputs (analog signals) from D/A converters 18 are applied to cathodes KR, KG, and KB of RGB color monitor 21 via cathode drive amplifiers 19 connected to the output stages of D/A converters 18. Contrast controller 20 controls the gains of amplifiers 19 so as to control the contrast of the entire screen of monitor 21.

OPERATION OF FIRST MODE

A body under examination (not shown in detail) is ultrasonically-scanned by an ultrasonic blood-flow imaging apparatus, and predetermined blood-flow data (first data in color) and echo data (second data in black and white) are thus acquired.

In the above initial conditions, with gradation converting control circuit 100 of this mode, the blood-flow data of the body under examination and echo data (the known B or M mode image) are separately written in digital scan converters 11 and 14 of the imaging apparatus. These data are read out at a timing of a display system. The blood-flow data is color-RGB-converted by color converting means 12. The echo data is RGB-converted and gradation-converted by gradation converting means 15. These conversion outputs are converted into analog signals by D/A converters 18 directly or after they are synthesized by synthesizing means 16, and are applied to cathodes KR, KG, and KB of RGB color monitor 21 via cathode drive amplifiers 19. In this situation, there are two cases. In a first case, the conversion outputs from converting means 12 and 15 are directly supplied to D/A converters 18. In a second case, the conversion outputs are synthesized and supplied to D/A converters 18. Either outputs from color converting means 12 and 15 or an output from synthesizing means 16 is appropriately selected by changing means 13 for every pixel of a displayed image and is supplied to D/A converters 18. In RGB color monitor 21, blood-flow information of the body under examination is normally superimposed as a color image, on a black-and-white image thereof, which is displayed in the two-dimensional B or M mode.

When gradation conversion is performed by gradation converting means 15, the dynamic range of an RGB signal output from D/A converters 18 becomes narrower than that of original data. If contrast controller 20 is controlled to compensate for the decrease in dynamic range, the dynamic range of the brightness on monitor 21 can be returned to the initial value.

In this manner, gradation converting control circuit 100 of this embodiment has gradation converting means 15. As shown in FIGS. 3 and 4, converting means 15 performs gradation conversion of black-and-white display data such that the maximum gradation of a black-and-white image becomes $\beta\vec{W}$ assuming that $\vec{C}$ and $\vec{W}$ are the maximum brightnesses of a displayed color and a black-and-white color, respectively, and that coefficient $\beta$ satisfies $0<\beta<1$. In other words, gradation-converted black/white data still exists in an equibrightness plane, as shown in FIGS. 3 and 4. As a result, brightness balance is accomplished between black-and-white and color images on the display screen of monitor 21, and the blood-flow information can be visually discriminated from the black-and-white image.

GRADATION CONVERTING CONTROL CIRCUIT OPERATED IN THE SECOND MODE

Gradation converting control circuit 200 operated in the second mode, according to a second preferred embodiment, will now be described with reference to FIG. 8.

Figure 8:
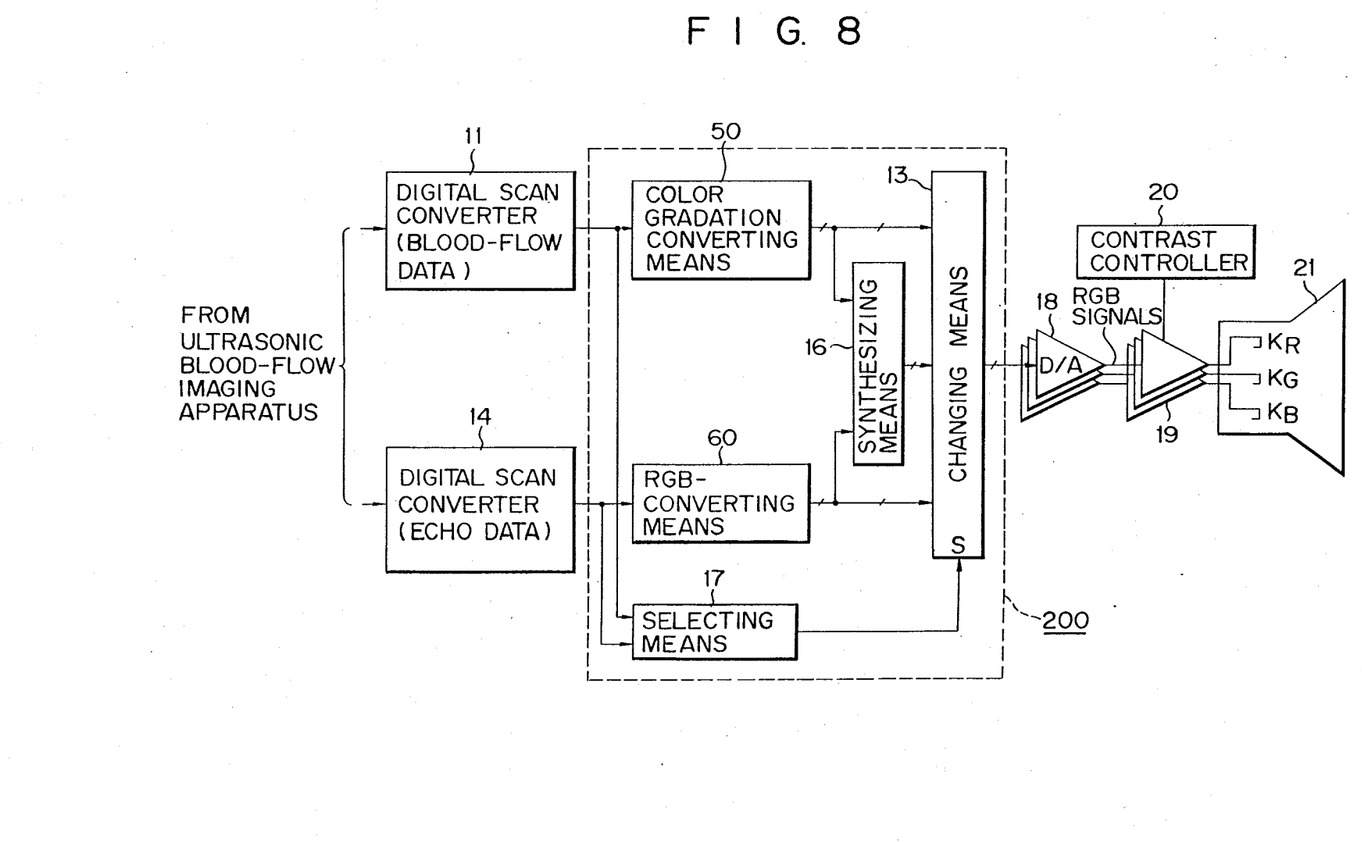
FIG. 8 is a schematic block diagram of a gradation converting control circuit 200 according to a second preferred embodiment.

The same reference numerals in FIG. 8 denote the same or similar circuit means as in FIG. 7.

In FIG. 8, the present invention is applied to an ultrasonic blood-flow imaging apparatus. Control circuit 200 has color gradation converting means 50, changing means 13, RGB-converting means 60, synthesizing means 16, and selecting means 17. Converting means 50 fetches blood-flow data (first data for color display) output from digital scan converter 11 and color-RGB converts and outputs it. Converting means 50 comprises, e.g., a ROM (Read-Only Memory) for storing color conversion data (RGB) as a function.

Color gradation converting means 50 is different from color converting means 12 of the first mode shown in FIG. 7 in the following respect. Converting means 50 of FIG. 8 color-converts blood-flow data by using $\alpha\vec{W}+(1-\alpha)\vec{C}$ as the maximum gradation of color display where $\vec{C}$ and $\vec{W}$ are maximum gradations of displayed and black-and-white colors, respectively and that coefficient $\alpha$ satisfies $0<\alpha<1$. The conversion result is output to changing means 13 and synthesizing means 16.

RGB-converting means 60 fetches echo data (second data for black-and-white display) output from digital scan converter 14 and RGB-converts the fetched data at the same weighting ratio for R, G, and B. An output from converting means 60 is fetched by changing and synthesizing means 13 and 16. Means 16 synthesizes outputs from converting means 50 and 60. Selecting means 17 compares the output states of digital scan converters 11 and 14. Changing means 13 operates in accordance with the comparison result, selects either output from synthesizing means 16 or outputs from converting means 50 and 60 (i.e., an appropriate output is selected in units of pixels), and supplies the selected output to D/A converters 18 connected to its output stage. Outputs (analog signals) from D/A converters 18 are applied to cathodes KR, KG, and KB of RGB color monitor 21 via cathode drive amplifiers 19 connected to the output stages of D/A converters 18. Contrast controller 20 controls the gains of amplifiers 19 in order to control the contrast of the entire screen of monitor 21.

OPERATION OF SECOND MODE

In gradation converting control circuit 200 shown in FIG. 8, the blood-flow data of a body under examination (not shown in detail) is written in digital scan converter 11 of the ultrasonic blood-flow imaging apparatus, and echo data (B or M mode image) is written in digital scan converter 14. These data are read out at a timing of a display system. The blood-flow data is color-RGB-converted by color gradation converting means 50. The echo data is RGB-converted by RGB-converting means 60. These conversion outputs are converted into analog signals by D/A converters 18 directly or after they are synthesized by synthesizing means 16, and are applied to cathodes KR, KG, and KB of RGB color monitor 21 via cathode drive amplifiers 19. On RGB color monitor 21, blood-flow information of the body under examination is superimposed as a color image on a B or M mode black-and-white two-dimensional image thereof in a similar manner to that in the case of circuit 100 of the first mode.

In order to allow easier understanding of color RGB conversion (gradation conversion) by control circuit 200 of this example (second mode) described above, a comparison will be made between control circuit 200 and a conventional control circuit with reference to FIGS. 9A and 9B.

Assume that the input voltages to cathodes KR, KG, and KB of RGB color monitor 21 are VR, VG, and VB, respectively, and one independent variable of blood-flow data is S. When the value of independent variable S is expressed by means of the gradation of magenta as a displayed color, the conversion result is high in saturation and low in brightness, as shown in FIG. 9A. In contrast to this, when color RGB conversion is performed under the conditions (circuit conditions of FIG. 8) described with reference to the control circuit of this embodiment, input voltage VG at Smax is 0.5 Vmax (the saturation is decreased while the brightness is increased), as shown in FIG. 9B. In FIG. 10, lines a and b indicate brightness changes corresponding to FIGS. 9A and 9B, respectively. Brightness 1.0 is the maximum brightness for VR=VG=VB=Vmax displayable by RGB color monitor 21. According to line a, the brightness is about 0.4 (0.4≈0.3 (R)+0.1 (B)) when independent variable S=Smax, while according to line b, the brightness is about 0.7 (0.7≈0.4/2+0.5). Thus, considerable improvement can be obtained in the brightness of a displayed color.

Figure 9A:
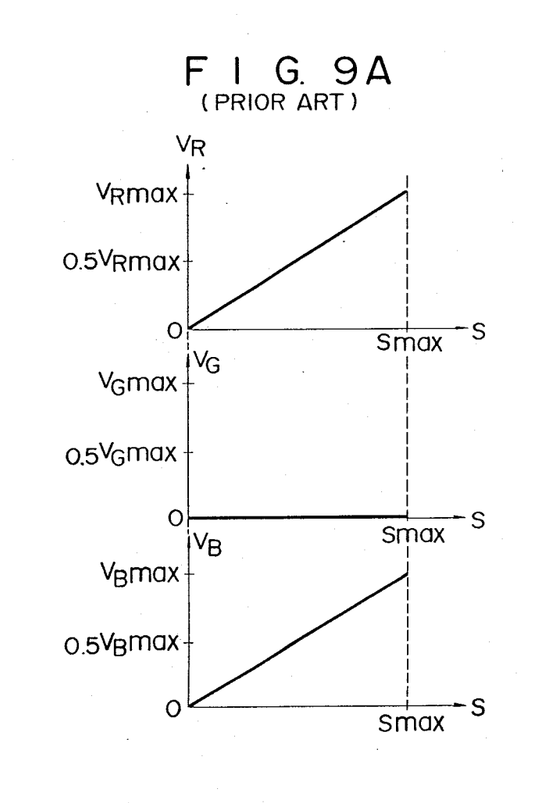
FIGS. 9A, 9B, and 10 are graphic representations for showing the color gradation conversion with reference to the circuit shown in FIG. 8.
Figure 9B:
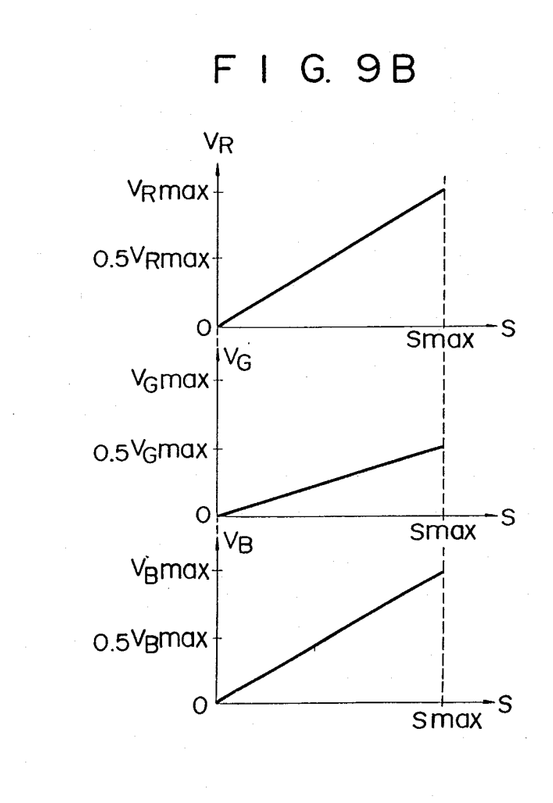
Figure 10:
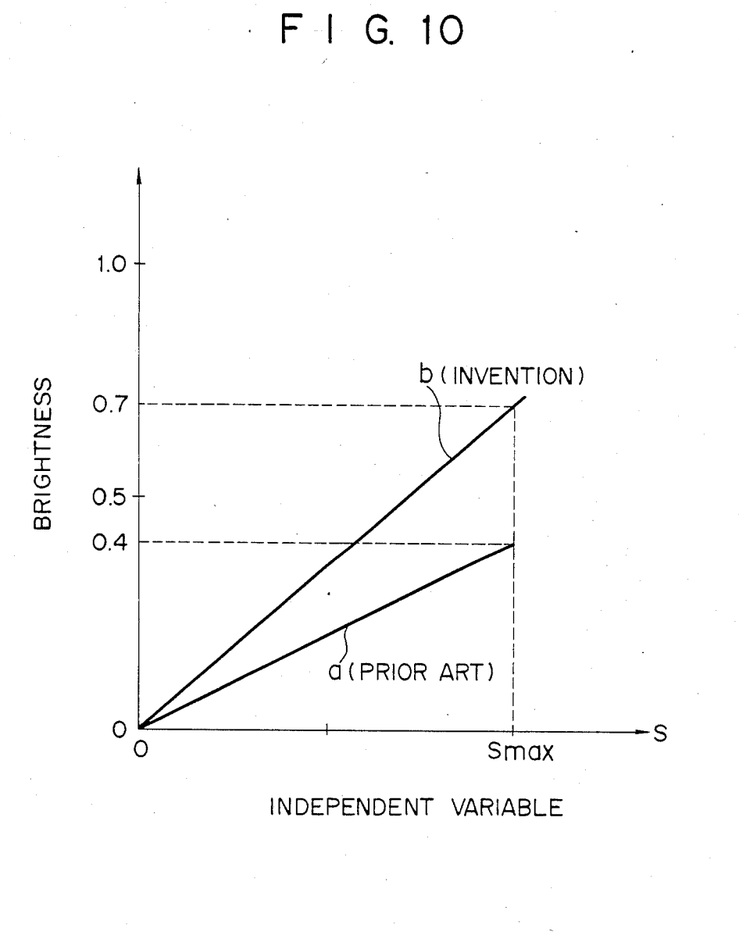

The gradation of a color shown in FIG. 9A obtained by a conventional control circuit is magenta. In contrast to this, the gradation of a color shown in FIG. 9B obtained by the control circuit of the present invention is a whitish magenta. This is because of increased brightness.

As described above in detail, gradation converting control circuit 200 of the present invention has color gradation converting means 50. Converting means 50 performs color gradation conversion of blood-flow data such that the maximum gradation of color display is $\alpha\vec{W}+(1-\alpha)\vec{C}$ assuming that $\vec{C}$ and $\vec{W}$ are the maximum brightnesses of a displayed color and a black-and-white color, respectively, as shown in FIGS. 5 and 6, and that coefficient "$\alpha$" satisfies $0<\alpha<1$. Thus, the saturation of a displayed color and the brightness of a color image are decreased and increased, respectively. As a result, brightness balance is accomplished between black-and-white and color images on the display screen of monitor 21, and the blood-flow information is displayed clearly in relation to the black-and-white image.

GRADATION CONVERTING CONTROL CIRCUIT OPERATED IN THE THIRD MODE

Gradation converting control circuit 300 operated in the third mode will now be described with reference to FIG. 11.

Figure 11:
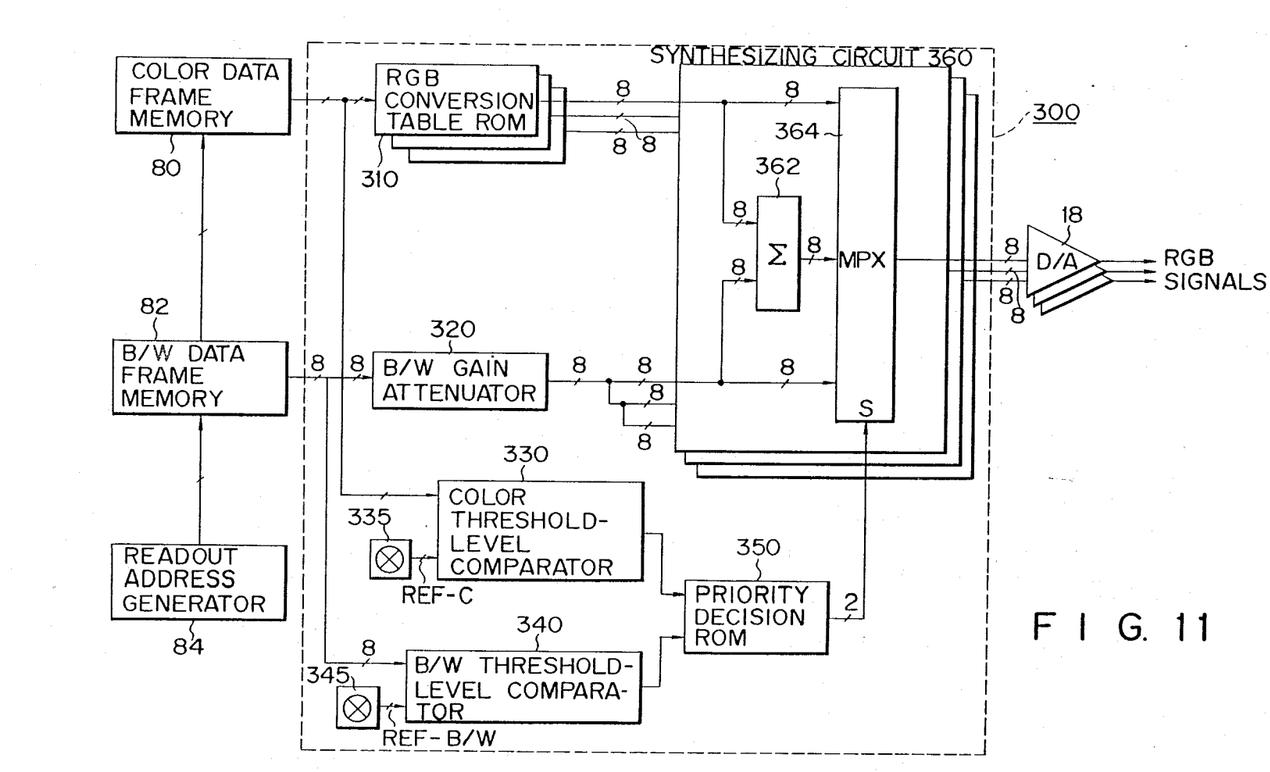
FIG. 11 is a schematic block diagram of a gradation converting control circuit 300 according to a third preferred embodiment.

Referring to FIG. 11, color frame memory 80 prestores blood-flow data obtained by ultrasonic-scanning of a body under examination. Echo data is prestored in B/W frame memory 82. Data readout from frame memories 80 and 82 is controlled by frame memory readout address generator 84. More specifically, under the control of address generator 84, the same addresses of frame memories 80 and 82 are simultaneously read out. It should be noted that color frame memory 80 and B/W frame memory 82 have the same readout address spaces. Therefore, when a frame is constituted on the screen of CRT (cathode ray tube 21), blood-flow data and the echo data are stored at the same addresses of memories 80 and 82, respectively.

Gradation converting control circuit 300 operating in the third mode mainly has 3 sets of RGB conversion table ROM 310, B/W gain attenuator 320, color threshold level comparator 330, B/W threshold level comparator 340, priority decision ROM 350, and synthesizing circuit 360. Level comparator 330 receives blood-flow data from memory 80 and reference level REF-C from reference level generator 335. Level comparator 340 receives echo data from memory 82 and reference level REF-B/W from reference level generator 345.

Each synthesizing circuit 360 has summing circuit 362 and multiplexer 364. Outputs of synthesizing circuits 360 are supplied to 3 sets of D/A converters 18 to obtain required RGB signals.

As described above, the color blood-flow and black/white echo data are simultaneously read out from frame memories 80 and 82, respectively. The pixel data of the color blood-flow is converted into an RGB digital signal by RGB conversion table ROM 310. The pixel data of the black/white echo data is converted into RGB-weighted digital signal by attenuator 320. These conversion digital signals are supplied to synthesizing circuit 360, synthesized in accordance with a predetermined method, and converted into a corresponding analog RGB signal by D/A converter 18.

The operation of synthesizing circuit 360 will now be described in detail together with the operations of threshold level comparators 330 and 340 and priority decision ROM 350.

Synthesizing circuit 360 decides whether the B/W RGB digital signal or the color RGB digital signal synthesized thereby is directly supplied to D/A converter 18, or both signals are summed and then supplied to D/A converter 18.

The following criterion is provided for the signal selection. More specifically, four states are generated depending on whether the average flow rate of the blood flow in the blood-flow data in color frame memory 80 and the gradation data in B/W frame memory 82 exceed corresponding threshold levels REF-C and REF-B/W, respectively. In accordance with these states, signal priority is decided by priority decision ROM 350 and a predetermined output is supplied to D/A converter 18 by multiplexer 364.

An example of the four states is as follows.

When input data is lower than a color threshold level and lower than a B/W threshold level, the converted color data signal and the gain-attenuated B/W data signal are summed by summing circuit 362 and supplied to D/A converter 18 by synthesizing circuit 360.

As described above, according to the present invention, there is provided a gradation converting control circuit capable of displaying a color image clearly when a black-and-white image and the color image are displayed on the same screen.

MODIFICATIONS

Although preferred embodiments of the present invention have been described, the present invention is not limited to these and various modifications can be made within the spirit and scope of the invention. In the above embodiments, the present invention is applied to an ultrasonic blood-flow imaging apparatus. However, the conversion control circuit of the present invention can be applied to various systems for superimposing a color image on a black-and-white image. For example, the apparatus according to the present invention can be applied to a meteorological chart display system or a display of a fish sonar.

What is claimed is:

1. A gradation converting control circuit for an image display apparatus wherein color display data and black/white display data of an object under examination are utilized to display the object with a superimposed combination of color and black/white images on a single monitor screen, comprising:

color-converting means for converting said color display data into RGB-color mode converted data;

gradation converting means for converting said black/white display data having an original maximum gradation W into a converted black/white display data having a converted maximum gradation $\beta W$ lower than the original maximum gradation, so that a brightness of said black/white display data is substantially equal to a brightness of said color display data, said converted maximum gradation being determined by $\beta \vec{W}$;

where $\beta$ is a coefficient defined by $0<\beta<1$; and means for superimposing and displaying said converted black/white display data and said color display data.

2. A circuit as claimed in claim 1, further comprising:

synthesizing means for synthesizing said RGB-color mode converted data and said converted black/white data; and means for comparing the color display data and black/white display data to produce a comparison result and for selecting one of said RGB-color mode converted data, said converted black/white display data, and said synthesized data, in accordance with said comparison result.

3. A circuit as claimed in claim 1, wherein said color-converting means includes a read-only memory for storing color conversion data corresponding to the RGB-color mode converted data.

4. A circuit as claimed in claim 1, wherein said image display apparatus comprises an ultrasonic blood flow imaging apparatus, said black/white display data represents a B-mode image obtained by sector-scanning the object under examination, and said color display data represents ultrasonic block flow information.

5. A gradation converting control circuit for an image display apparatus wherein color display data and black/white display data of an object under examination are utilized to display the object with color and black/white images on a single monitor screen, comprising:

RGB-converting means for converting said black/white display data into a RGB-converted black/white display data;

color gradation converting means for gradation-converting said color display data having an original maximum gradation $\vec{C}$ into a converted color display data having a converted maximum gradation higher than the original maximum gradation so that a brightness of said converted color display data becomes substantially equal to a brightness of said black/white display data, said converted maximum gradation being determined by $\alpha \vec{W} + (1-\alpha)\vec{C}$, where $\vec{W}$ is an original maximum gradation of the black and white display data, and $\alpha$ is a coefficient defined by $0<\alpha<1$; and means for superimposing and displaying said black/white display data and said converted color display data.

6. A circuit as claimed in claim 5, further comprising:

synthesizing means for synthesizing said RGB-converting black/white display data and said gradation-converted color display data; and means for comparing the color display data with the black/white display data to produce a comparison result and for selecting one of said RGB-converted black/white display data, said gradation-converted color display data, and synthesized data, in accordance with said comparison result.

7. A circuit as claimed in claim 5, wherein said color gradation converting means includes a read only memory for storing color conversion data corresponding to the converted color display data.

8. A gradation converting control circuit for an image display apparatus wherein color display data and black/white display data of an object under examination are utilized to display the object with color and black/white images on a single monitor screen, comprising:

gradation converting means for converting said black/white display data having an original maximum gradation $\vec{W}$ into a converted black/white display data having a converted maximum gradation lower than the original maximum gradation, said converted maximum gradation being determined by $\beta W$, where $\beta$ is a coefficient defined by $0<\beta<1$;

color gradation converting means for gradation-converting the intensity of said color data under the condition that the maximum gradation of said color display data is $\alpha \vec{W} + (1-\alpha)\vec{C}$, where $\vec{C}$ is the original maximum gradation of the color display data and $\alpha$ is a coefficient defined by $0<\alpha<1$; and means for superimposing and displaying the converted black/white display data and the converted color display data.

9. A circuit as claimed in claim 8, wherein said gradation converting control means further includes:

first generator means for generating a color reference threshold level;

first comparator means for comparing said color reference threshold level with said color display data to output a first comparison result signal;

second generator means for generating a black/white reference threshold level;

second comparator means for comparing said black/white reference threshold level with said black/white display data to output a second comparison result signal;

synthesizing means for synthesizing said gradation-converted black/white display data and said gradation converted color display data; and priority decision means for determining priority of data to be output from said synthesizing means based upon said first and second comparison result signals.

10. A circuit as claimed in claim 8, wherein said color-converting means includes a read-only memory for storing color conversion data corresponding to the color display data.

* * * * *